US009292839B2

(12) United States Patent
Gupta et al.

(10) Patent No.: US 9,292,839 B2
(45) Date of Patent: Mar. 22, 2016

(54) SYSTEM AND METHOD FOR PERSONALIZED COMMANDS

(71) Applicant: Amazon Technologies, Inc., Reno, NV (US)

(72) Inventors: Diwakar Gupta, Seattle, WA (US); Chih-Jen Huang, Issaquah, WA (US); Philip Yuen, Bellevue, WA (US); Gerald Yuen, Pasadena, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/281,533

(22) Filed: May 19, 2014

(65) Prior Publication Data

US 2014/0258103 A1  Sep. 11, 2014

Related U.S. Application Data

(63) Continuation of application No. 13/525,007, filed on Jun. 15, 2012, now Pat. No. 8,732,075, which is a continuation of application No. 12/056,608, filed on Mar. 27, 2008, now Pat. No. 8,204,827.

(51) Int. Cl.
*G06Q 40/00* (2012.01)
*G06Q 20/10* (2012.01)
*G06F 9/44* (2006.01)

(52) U.S. Cl.
CPC .............. *G06Q 20/10* (2013.01); *G06F 9/4443* (2013.01); *G06Q 40/12* (2013.12)

(58) Field of Classification Search
CPC ....... G06Q 10/00; G06Q 20/00; G06Q 30/00; G06Q 40/00
USPC ........................................................ 705/3–44
See application file for complete search history.

(56) References Cited

U.S. PATENT DOCUMENTS 5,179,721 A   1/1993  Comroe et al.
5,475,756 A  12/1995  Merritt
(Continued)

FOREIGN PATENT DOCUMENTS

EP   0668580   8/1995
GB   2397731   7/2004
(Continued)

OTHER PUBLICATIONS

U.S. Appl. No. 13/525,007, filed Jun. 15, 2012, Diwakar Gupta.
(Continued)

*Primary Examiner* — Frantzy Poinvil
(74) *Attorney, Agent, or Firm* — Robert C. Kowert; Meyertons, Hodd, Kivlin, Kowert & Goetzel, P.C.

(57) ABSTRACT

Various embodiments of a system and method for personalized commands are described. The system and method for personalized commands may include a payment service including a command management component. Such payment service may be responsive to one or more base commands. The command management component may be configured to generate a user interface for specifying personalized commands that correspond to the base commands. The command management component may be configured to generate mapping information from the information received via the user interface. The command management component may be configured to receive one or more messages that may include commands for the payment service, including personalized commands. From the personalized commands, the command management component may be configured to determine a corresponding base commands (e.g., based on the mapping information). Once the base command is determined, the payment service may perform the base command.

17 Claims, 10 Drawing Sheets

(56) References Cited

U.S. PATENT DOCUMENTS

| | | | |
|---|---|---|---|
| 5,613,012 A | 3/1997 | Hoffman et al. | |
| 5,802,499 A | 9/1998 | Sampson et al. | |
| 5,937,396 A | 8/1999 | Konya | |
| 5,949,044 A | 9/1999 | Walker et al. | |
| 5,956,700 A | 9/1999 | Landry | |
| 6,085,194 A | 7/2000 | Ige et al. | |
| 6,394,907 B1 | 5/2002 | Rowe | |
| 6,430,407 B1 | 8/2002 | Turtiainen | |
| 6,601,057 B1 | 7/2003 | Underwood et al. | |
| 6,609,113 B1 | 8/2003 | O'Leary et al. | |
| 6,816,724 B1 | 11/2004 | Asikainen | |
| 7,031,733 B2 | 4/2006 | Alminana et al. | |
| 7,076,329 B1 | 7/2006 | Kalis | |
| 7,089,208 B1 | 8/2006 | Levchin et al. | |
| 7,127,264 B2 | 10/2006 | Hronek et al. | |
| 7,139,694 B2 | 11/2006 | Horn et al. | |
| 7,240,832 B2 | 7/2007 | Bendeck et al. | |
| 7,245,902 B2 | 7/2007 | Hawkes | |
| 7,245,905 B2 | 7/2007 | Hawkes | |
| 7,251,495 B2 | 7/2007 | Keyani et al. | |
| 7,500,602 B2 * | 3/2009 | Gray | 235/380 |
| 7,636,695 B2 | 12/2009 | Driessen | |
| 7,693,797 B2 | 4/2010 | Ekberg | |
| 7,716,199 B2 | 5/2010 | Guha | |
| 7,729,989 B1 | 6/2010 | Yuen et al. | |
| 7,865,428 B2 * | 1/2011 | Pegaz-Paquet et al. | 705/38 |
| 7,904,799 B1 | 3/2011 | Underwood et al. | |
| 8,015,070 B2 * | 9/2011 | Sinha et al. | 705/26.1 |
| 8,139,736 B2 * | 3/2012 | Brown et al. | 379/114.21 |
| 2001/0037264 A1 | 11/2001 | Husemann et al. | |
| 2002/0046353 A1 | 4/2002 | Kishimoto | |
| 2002/0049644 A1 | 4/2002 | Kargman | |
| 2002/0123940 A1 | 9/2002 | Spets | |
| 2002/0156746 A1 | 10/2002 | Horn et al. | |
| 2002/0198849 A1 | 12/2002 | Piikivi | |
| 2003/0033522 A1 | 2/2003 | Bilgic et al. | |
| 2003/0065615 A1 | 4/2003 | Aschir | |
| 2003/0091170 A1 | 5/2003 | McCann et al. | |
| 2003/0105707 A1 | 6/2003 | Audebert et al. | |
| 2003/0110114 A1 | 6/2003 | Dmochowski | |
| 2003/0123669 A1 | 7/2003 | Koukoulidis et al. | |
| 2003/0126076 A1 | 7/2003 | Kwok et al. | |
| 2003/0139174 A1 | 7/2003 | Rao | |
| 2003/0144952 A1 | 7/2003 | Brown et al. | |
| 2003/0166396 A1 | 9/2003 | Vermelle et al. | |
| 2003/0171993 A1 | 9/2003 | Chappuis | |
| 2003/0212601 A1 | 11/2003 | Silva et al. | |
| 2003/0220074 A1 | 11/2003 | Wee et al. | |
| 2004/0006538 A1 | 1/2004 | Steinberg et al. | |
| 2004/0019564 A1 | 1/2004 | Goldthwaite et al. | |
| 2004/0029569 A1 | 2/2004 | Khan et al. | |
| 2004/0078340 A1 | 4/2004 | Evans | |
| 2004/0081110 A1 | 4/2004 | Koskimies | |
| 2004/0205026 A1 | 10/2004 | Shah et al. | |
| 2004/0214597 A1 | 10/2004 | Suryanarayana et al. | |
| 2004/0260603 A1 | 12/2004 | Marmotta | |
| 2005/0044410 A1 | 2/2005 | Yan | |
| 2005/0060250 A1 | 3/2005 | Heller et al. | |
| 2005/0102230 A1 | 5/2005 | Haidar | |
| 2005/0113066 A1 | 5/2005 | Hamberg | |
| 2005/0120249 A1 | 6/2005 | Shuster | |
| 2005/0144020 A1 | 6/2005 | Muzaffar et al. | |
| 2005/0192893 A1 | 9/2005 | Keeling et al. | |
| 2005/0220134 A1 | 10/2005 | Lin | |
| 2005/0238149 A1 | 10/2005 | De Leon | |
| 2005/0256781 A1 | 11/2005 | Sands et al. | |
| 2006/0080232 A1 | 4/2006 | Epps | |
| 2006/0131390 A1 | 6/2006 | Kim | |
| 2006/0136334 A1 | 6/2006 | Atkinson et al. | |
| 2006/0149644 A1 | 7/2006 | Sulmar et al. | |
| 2006/0165060 A1 | 7/2006 | Dua | |
| 2006/0206709 A1 | 9/2006 | Labrou et al. | |
| 2006/0253335 A1 | 11/2006 | Keena et al. | |
| 2006/0253339 A1 | 11/2006 | Singh et al. | |
| 2006/0253392 A1 | 11/2006 | Davies | |
| 2007/0022019 A1 | 1/2007 | Sherwin et al. | |
| 2007/0027775 A1 | 2/2007 | Hwang | |
| 2007/0047719 A1 | 3/2007 | Dhawan et al. | |
| 2007/0049303 A1 | 3/2007 | Lee | |
| 2007/0054678 A1 | 3/2007 | Daulton | |
| 2007/0067398 A1 | 3/2007 | Karmarkar | |
| 2007/0094135 A1 | 4/2007 | Moore et al. | |
| 2007/0100651 A1 | 5/2007 | Ramer et al. | |
| 2007/0106564 A1 | 5/2007 | Matotek et al. | |
| 2007/0118514 A1 | 5/2007 | Mariappan | |
| 2007/0192245 A1 | 8/2007 | Fisher et al. | |
| 2007/0213991 A1 | 9/2007 | Bramante | |
| 2007/0233615 A1 | 10/2007 | Tumminaro | |
| 2007/0244811 A1 | 10/2007 | Tumminaro | |
| 2007/0250920 A1 | 10/2007 | Lindsay | |
| 2007/0255620 A1 | 11/2007 | Tumminaro et al. | |
| 2007/0255652 A1 | 11/2007 | Tumminaro et al. | |
| 2007/0255653 A1 | 11/2007 | Tumminaro et al. | |
| 2007/0255662 A1 | 11/2007 | Tumminaro | |
| 2007/0257108 A1 | 11/2007 | Bellino et al. | |
| 2007/0282756 A1 | 12/2007 | Dravenstott et al. | |
| 2008/0003977 A1 | 1/2008 | Chakiris et al. | |
| 2008/0006685 A1 | 1/2008 | Rackley, III et al. | |
| 2008/0010190 A1 | 1/2008 | Rackley, III et al. | |
| 2008/0010191 A1 | 1/2008 | Rackley, III et al. | |
| 2008/0010192 A1 | 1/2008 | Rackley, III et al. | |
| 2008/0010193 A1 | 1/2008 | Rackley, III et al. | |
| 2008/0010196 A1 | 1/2008 | Rackley, III et al. | |
| 2008/0010204 A1 | 1/2008 | Rackley, III et al. | |
| 2008/0010215 A1 | 1/2008 | Rackley, III et al. | |
| 2008/0017702 A1 | 1/2008 | Little et al. | |
| 2008/0027844 A1 | 1/2008 | Little et al. | |
| 2008/0040233 A1 | 2/2008 | Wildman et al. | |
| 2008/0040265 A1 | 2/2008 | Rackley, III et al. | |
| 2008/0052620 A1 | 2/2008 | Hwang | |
| 2008/0071633 A1 | 3/2008 | Ozkan et al. | |
| 2008/0109472 A1 | 5/2008 | Underwood et al. | |
| 2008/0147741 A1 | 6/2008 | Gonen et al. | |
| 2008/0177661 A1 | 7/2008 | Mehra | |
| 2008/0181198 A1 | 7/2008 | Yasrebi et al. | |
| 2008/0270251 A1 | 10/2008 | Coelho et al. | |
| 2008/0291899 A1 | 11/2008 | Gromoll et al. | |
| 2009/0070263 A1 | 3/2009 | Davis et al. | |
| 2009/0081989 A1 | 3/2009 | Wuhrer | |
| 2009/0106138 A1 | 4/2009 | Smith et al. | |
| 2009/0119190 A1 | 5/2009 | Realini | |
| 2009/0132392 A1 | 5/2009 | Davis et al. | |
| 2009/0287601 A1 | 11/2009 | Tumminaro et al. | |
| 2010/0016002 A1 | 1/2010 | Konicek et al. | |
| 2010/0041366 A1 | 2/2010 | Zackrisson | |
| 2010/0130164 A1 | 5/2010 | Chowdhury et al. | |
| 2010/0145835 A1 | 6/2010 | Davis et al. | |
| 2011/0069657 A1 | 3/2011 | Gholmieh et al. | |

FOREIGN PATENT DOCUMENTS

| | | |
|---|---|---|
| JP | 2002-207934 | 7/2002 |
| KR | 2002-0045082 | 6/2002 |
| KR | 2005-0007986 | 1/2005 |
| KR | 2005-0120890 | 12/2005 |
| KR | 2005-0122935 | 12/2005 |
| KR | 2006-0114776 | 11/2006 |
| KR | 2006-0106328 | 12/2006 |
| WO | 01/17310 | 3/2001 |
| WO | 03-005270 | 1/2003 |

OTHER PUBLICATIONS

Layton, J., "How ebay Works," How Stuff Works website. Dec. 3, 2005, All pages.

U.S. Appl. No. 12/056,620, filed Mar. 27, 2008, Chesley Coughlin, et al.

U.S. Appl. No. 12/057,148, filed Mar. 27, 2008, Vishay S. Nihalani, et al.

U.S. Appl. No. 11/858,001, filed Sep. 19, 2007, Philip Yuen, et al.

U.S. Appl. No. 11/546,534, filed Oct. 10, 2006, Philip Yuen, et al.

U.S. Appl. No. 11/546,030, filed Oct. 10, 2006, Philip Yuen, et al.

(56) References Cited

OTHER PUBLICATIONS

U.S. Appl. No. 11/611,716, filed Dec. 15, 2006, Christopher L. Scofield, et al.

U.S. Appl. No. 11/858,006, filed Sep. 19, 2007, Philip Yuen, et al.
U.S. Appl. No. 11/858,002, filed Sep. 19, 2007, Philip Yuen, et al.
U.S. Appl. No. 12/056,608, filed Mar. 27, 2008, Diwakar Gupta.

* cited by examiner

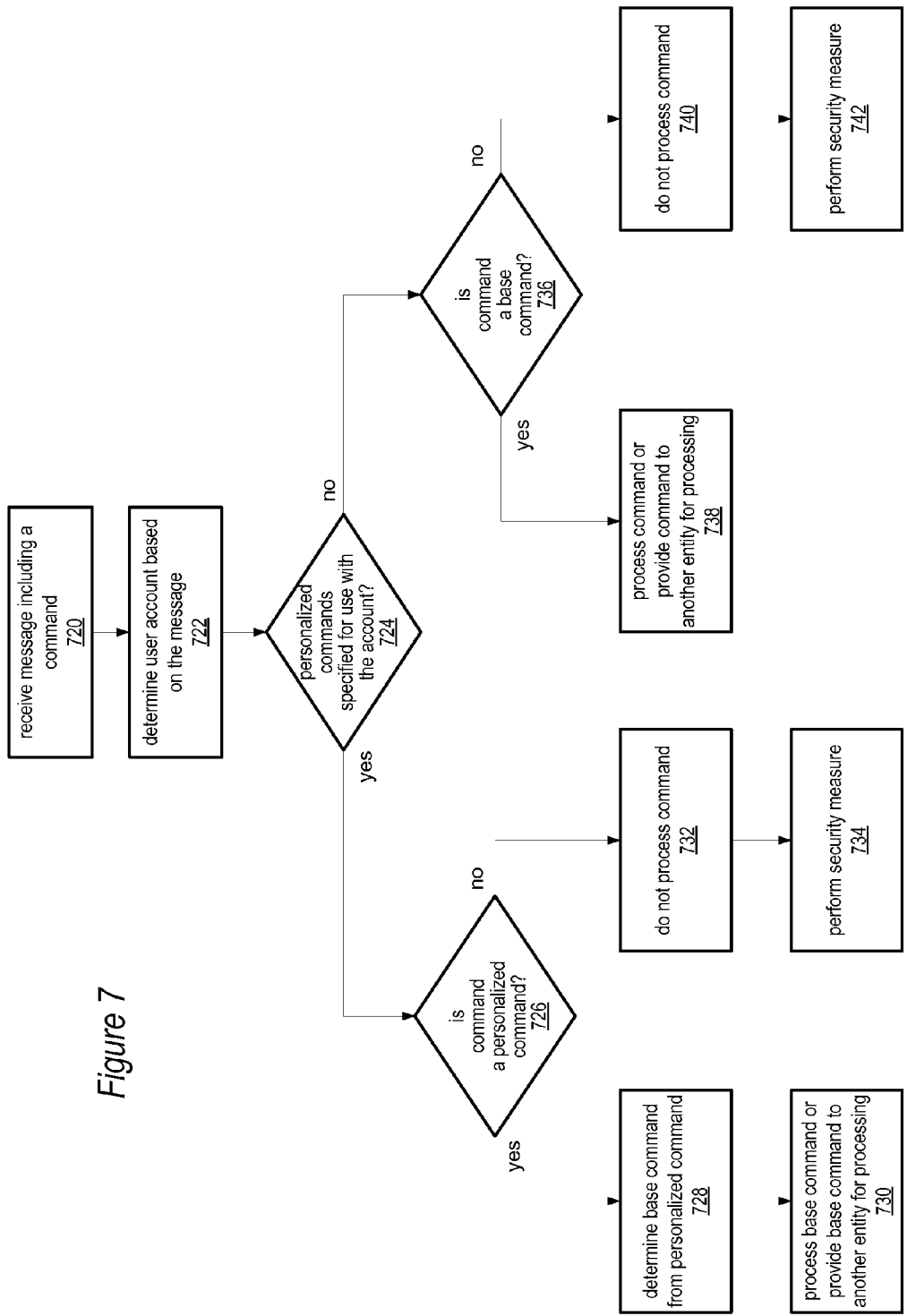

SYSTEM AND METHOD FOR PERSONALIZED COMMANDS

This application is a continuation of U.S. application Ser. No. 13/525,007, filed Jun. 15, 2012, now U.S. Pat. No. 8,732,075, which is a continuation of U.S. application Ser. No. 12/056,608, filed Mar. 27, 2008, now U.S. Pat. No. 8,204,827 which are incorporated herein by reference in their entirety.

BACKGROUND

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Web Services

Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Mobile Telephony and SMS

Mobile telephony has emerged alongside the Internet and the web, and the two technologies have crossed over and merged to form what is essentially a global communications and information network. Cellular telephones, for example, have become "digital", and continue to become more sophisticated. Today, many digital cell phones are capable of web access via their cellular service providers. Similarly, many web applications are capable of telephone communications to conventional phones and to mobile telephones. In addition, other technologies such as text messaging have emerged to enhance the capabilities and uses of mobile telephones and other personal electronic devices. Further, other personal electronic devices, such as Personal Digital Assistants (PDAs) may provide mobile telephone links to the web, and user interfaces for accessing the web, along with text messaging and other information and communications capabilities. Thus, these devices are part of the emerging global communications and information network. SMS (Short Message Service) is a service for sending messages of up to 160 characters (224 characters if using a 5-bit mode) to mobile phones. SMS does not require the mobile phone to be active and within range. An SMS message may be held until the target phone is active and within range. SMS messages may be transmitted within the same cell, or out of the cell to phones with roaming service capability. SMS messages may also be sent to digital phones from a web site, or from one digital phone to another. An SMS gateway is a web site that accepts SMS messages for transmission to cell phones within the cell served by that gateway, or that acts as an international gateway for users with roaming capability.

Various applications of the Internet, and of the web, involve electronic transactions, such as funds transfers. These applications involve the transfer of funds from one entity to one or more other entities. These applications range from transferal of funds between financial institutions to electronic payment by individuals for purchases of goods or services from e-commerce sites. With the merging of mobile telephony and other technologies and the web into an emerging global communications and information network, these other technologies have become part of the transaction process for many such applications.

BRIEF DESCRIPTION OF THE DRAWINGS

FIG. 7 illustrates a flowchart of an exemplary method for processing personalized commands, according to various embodiments.

Figure 1:
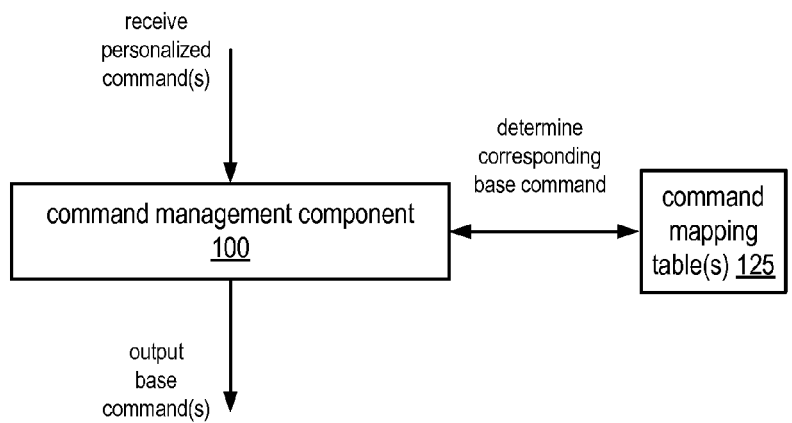
FIG. 1 illustrates a block diagram of a command management component and command mapping tables, according to various embodiments.

While the system and method for personalized commands is described herein by way of example for several embodiments and illustrative drawings, those skilled in the art will recognize that the system and method for personalized commands is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for personalized commands as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for personalized commands are described. The system and method for personalized commands may include a payment service including a command management component. Such payment service may be responsive to one or more base commands. For example, such commands may include commands for transferring funds, making a payment, or checking an account balance. The command management component may be configured to generate a user interface for specifying personalized commands that correspond to the base commands. For example, the user may specify the personalized command "P" to be used in place of the command "purchase." Note that this command is merely exemplary and other types of commands are possible and contemplated. The command management component may also be configured to generate mapping information from the information received via the user interface. For instance, mapping information may map a personalized command to a base command. The command management component may also be configured to receive one or more messages that may include commands for the payment service. Such commands may include personalized commands, such as personalized commands the user has specified via the user interface. From the personalized commands, the command management component may be configured to determine corresponding base commands. In various embodiments, this determination may be made based on the generated mapping information. Once the base command is determined, the payment service may perform the base command (e.g., transferring funds, performing a payment, etc.).

In various embodiments, the command management component described herein may be configured to receive commands via a variety of communication channels. Communications channels may include any methods or mechanisms for transmitting information between entities. Communications channels generally include protocols for information transfer (e.g., Short Message Service (SMS) for text messaging), media over or through which information is transmitted according to the protocols, and infrastructures for supporting the transmissions (e.g., cellular telephone service providers). Further, a communications channel may require devices that enable entities to communicate via the communications channel, for example a mobile phone, satellite phone, cell phone, conventional telephone, computer system, or Personal Digital Assistant (PDA). Examples of communications channels include, but are not limited to, conventional, land-based telephone systems, mobile or cellular telephone systems, satellite telephone systems, email, instant messaging (IM), Voice over IP (VoIP), and text messaging. Note that separate communications channels may share one or more of protocol, media, infrastructure, and enabling device. For example, text messaging and cellular telephone systems may be enabled through the same device (a cell phone) and may transmit over the same medium. Note that communications on communications channels over which voice messages may be transmitted (e.g., conventional, land-based telephone systems, mobile or cellular telephone systems, satellite telephone systems, VoIP, etc.) may collectively be referred to herein as "voice communications", and likewise the channels may be referred to collectively as "voice communications channels". Further note that voice communications includes both "live" or real human voice communications and automated voice systems. Automated voice systems include automated systems in which synthesized or recorded voice messages are transmitted to communicate information. Note that some automated voice systems may transmit at least some synthesized or recorded voice messages in response to vocal input (via voice recognition technology) or other input into a communication device (e.g., numeric key pad entries).

FIG. 1 illustrates a command management component, such as command management component 100, according to some embodiments. Command management component 100 may be configured to generate and/or manage information that indicates a correspondence or correlation between commands of a base command set and respective commands of a personalized command set, such as command mapping table(s) 125. For example, command mapping table(s) may map a base command "purchase" to a personalized command "P." For instance, on various devices, such as devices lacking a QWERTY keyboard, the command "P" may be more convenient to type than the command "purchase." This example is provided for illustrative purposes only and is not intended to be limiting. As described in more detail below, other types of commands, such as commands providing increased security, may be employed in various embodiments.

The information that indicates a correspondence between commands of a base command set and respective commands of a personalized command set may be referred to herein as "mapping information." Mapping information may in some cases be specified by a user. Accordingly, the command management component may be configured to generate and/or provide a user interface for receiving mapping information from the user, as described in more detail below. While the mapping information is illustrated as command mapping table(s) 125, such information may in various embodiments be stored within various other types of data structures.

As demonstrated by the illustrated embodiment, command management component 100 may be configured to receive personalized commands, such as commands received from a user or another system. For each personalized command that is received, the command management component may determine a corresponding base command. In various embodiments, this determination may be based on the mapping information indicated by command mapping table(s) 125.

Figure 2:
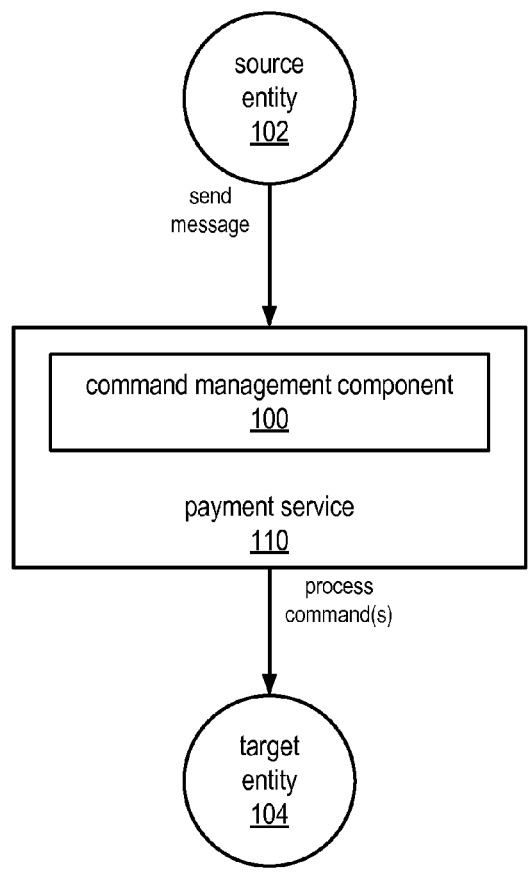
FIG. 2 illustrates a block diagram of a command management component implemented as a component of a payment service, according to various embodiments.

FIG. 2 illustrates command management component 100 implemented as a component of a payment service, such as payment service 110, according to some embodiments. In one embodiment, a first, or source, entity 102 may send a message that includes one or more commands to the payment service. For instance, entity 102 may send a command to initiate a transaction (e.g., a payment or money transfer) with a second, or target entity 104 via a payment service 110 through a communication channel, for example a text message initiated from a cell phone or other device capable of text messaging, a telephone call via a conventional land-based telephone, a telephone call via a mobile/cellular phone, an email message, or over some other communications channel. In other embodiments, messages sent from the source entity and/or received by the payment service may include various other commands including but not limited to commands for checking an account balance (e.g., a balance of monetary funds), sending a request for funds from another entity or entities, and/or purchasing one or more items.

In one embodiment, the payment service may enable users (e.g., entity 102) to enter text message commands on a communications device (e.g., a cell phone) that is text-message capable and to transmit the commands to payment service 110 at a specified address. In one embodiment, text messages may adhere to the Short Message Service (SMS) protocol. In other embodiments, text messages may include any type of message that includes one or more text strings, such as an email message, an instant message (IM), or some other text-based message. The following is an exemplary format for such a command, which is not intended to be limiting:

Pay <amount> to <phone number>

In the above exemplary command, <amount> represents the monetary amount to be paid, and <phone number> represents a phone number of the payee (e.g., target entity 104). Note that text message commands to initiate other types of transactions, or to initiate other functions of the payment service 110, may also be sent to payment service 110. In addition, in some embodiments, source entity 102 may enter such a command on a communications device to initiate a transaction (e.g., a payment) with target entity 104. For instance, source entity 102 may specify an amount to be paid and a phone number associated with target entity 104.

In various embodiments, the commands to which payment service 110 is responsive may form a base set of commands, which may be referred to herein as a "base command set." Commands of such set may also be referred to herein as "base commands." As described above with respect to FIG. 1, command management component 100 may be configured to generate and/or manage information that indicates a correspondence or correlation between commands of a base command set and respective commands of a personalized command set. Accordingly, command management component 100 may enable payment service 110 to receive personalized commands. For instance, in one embodiment, the command management component may receive a message sent by source entity 102. The commands management component may parse a command within the message and replace the command with a corresponding base command. The command management component may pass the corresponding base command to the payment component for further processing. Note that this example is not intended to be limiting and other techniques for providing the payment service are possible and contemplated. Such techniques are described below in more detail, such as with respect to the description of FIG. 5.

In some embodiments, messages sent by source entity 102 may include commands that require interaction with target entity 104. For instance, as described above, such messages may include a command to, e.g., initiate a transaction with the target entity or, e.g., request a payment from the target entity. In such embodiments, the payment service may be configured to notify (e.g., by providing a notification message) target entity 104 of such commands. In various embodiments, such notification message may include an indication that the notification message is authentic (e.g., is from the payment service 110). The target entity 104 may respond to the notification message and complete the transaction with the payment service 110, e.g., by communicating with the payment service 110 to receive a payment or a transferal of funds initiated by the first entity 102. Note that in some embodiments a message sent by source entity 102 to payment service 110 may include a command that does not require interaction with the illustrated target entity. For instance, such messages might include a command for a balance inquiry.

The message(s) sent by the source entity to the payment service may include information that may be used to identify the source entity 102, or may otherwise be identifiable as being from the particular entity. In some embodiments, the payment service 110 may identify the message as authentic (as being from the source entity) via one or more methods. For example, in one embodiment, caller ID may be used to identify the message as authentic. In one embodiment, the messages may include a security phrase or other identifier known only to the source entity and to the payment service. Other methods for identifying the messages as authentic may be used in various embodiments. The messages may also include information that includes, but is not limited to, information identifying the target entity or entities (e.g., a telephone number, account number, email address, alias, etc.), and an amount to be paid or transferred to the target entity(s).

Before completing a transaction to the target entity 104, the payment service 110 may in various embodiments authorize the transaction with the source entity 102 via communications through a second and separate communications channel, for example a telephone call to a cell phone, standard telephone, PDA, or other device capable of telephone communications, via a text message to a text-message-capable device in possession of the source entity 102, or through some other communications channel. Note that the initiation of the transaction and the authorization of the transaction may be, but are not necessarily, performed by the source entity 102 using the same device (e.g., a cell phone), but that two different communications channels are used.

Note that the payment service 110 may be used to perform the actual funds transfer for the transaction, and thus may provide accounts for funds transfer to various entities which may include either one or both of source entity 102 and target entity 102, or alternatively the payment service 110 may serve as a service for one or more other services that perform the actual funds transfer.

Further note that the source entity 102 and/or the target entity 104 may represent individuals or corporate entities, such as organizations, businesses, retail businesses, industrial enterprises, e-commerce businesses, governmental entities, or in general any two entities between which a transaction may take place. Further note that the transaction may be a payment for goods or services, a money or other commodity transfer, a payment or transfer for other purposes (e.g., for tax purposes), or in general any transaction involving the transferal of a commodity from one entity to another. Further note that embodiments may be used for other purposes than for authorization of transfers of commodities, for example for authorizing the scheduling, allocation, or transferal of resources, for scheduling and responding to meetings, etc.

In various embodiments, for a base set of commands including one or more base commands, the command management component may enable a user (e.g., source entity 102) to register one or more corresponding personalized commands. In various embodiments, each personalized command may be different than its respective base command. In one example, a personalized command may be an abbreviated version of a corresponding base command. Such personalized commands may facilitate quicker and easier text entry. For instance, on various devices, such as devices lacking a QWERTY keyboard, the personalized command "P" may be more convenient to type than the base command "purchase." In some embodiments, such personalized commands may be employed when security is not a primary concern of the user. In another example, a personalized command may include a sequence of letters, numbers, and/or symbols arranged in a manner to ensure high security. For instance, instead of the base command "purchase," a personalized command might be "5dV@93kROp." In this way, if a user's device were to be lost or stolen, it may be difficult for an unauthorized individual to send such commands from the lost or stolen device.

Figure 3:
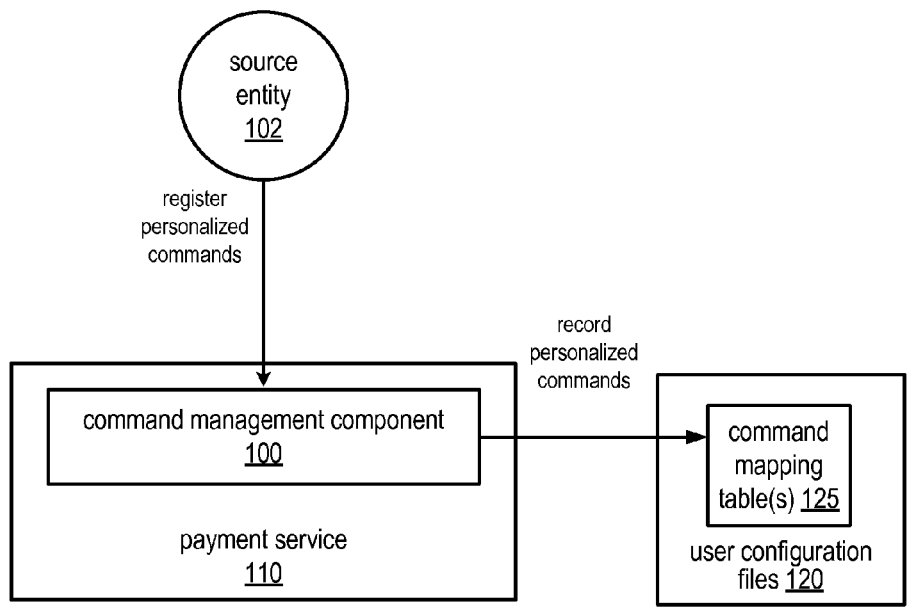
FIG. 3 illustrates the registration of personalized commands by the command management component, according to various embodiments.

FIG. 3 illustrates a user (e.g., source entity 102) registering personalized commands for use with the payment service. As described above, the payment service may be responsive to one or more commands of a base command set. For instance, to register personalized commands with the command management component, the user may provide such commands to the command management component via a user interface provided by the command management component. For example, such user interface may present a base command to the user (e.g., "purchase") and prompt the user to enter a corresponding personalized command of the user's choice (e.g., "P"). For each personalized command received, the command management component may record the particular command and such command's corresponding base command, e.g., in an entry of command mapping table(s) 125. In some embodiments, as is the case in the illustrated embodiments, mapping information may be stored with a user's configuration file, as illustrated by user configuration files 120. For instance, a particular user's configuration file may include, but is not limited to, contact information, payment preferences, shipping preferences, and/or account preferences. In this way, a user may provide personalized commands that may be used in place of base commands with respect to interacting with the payment service.

Figure 4:
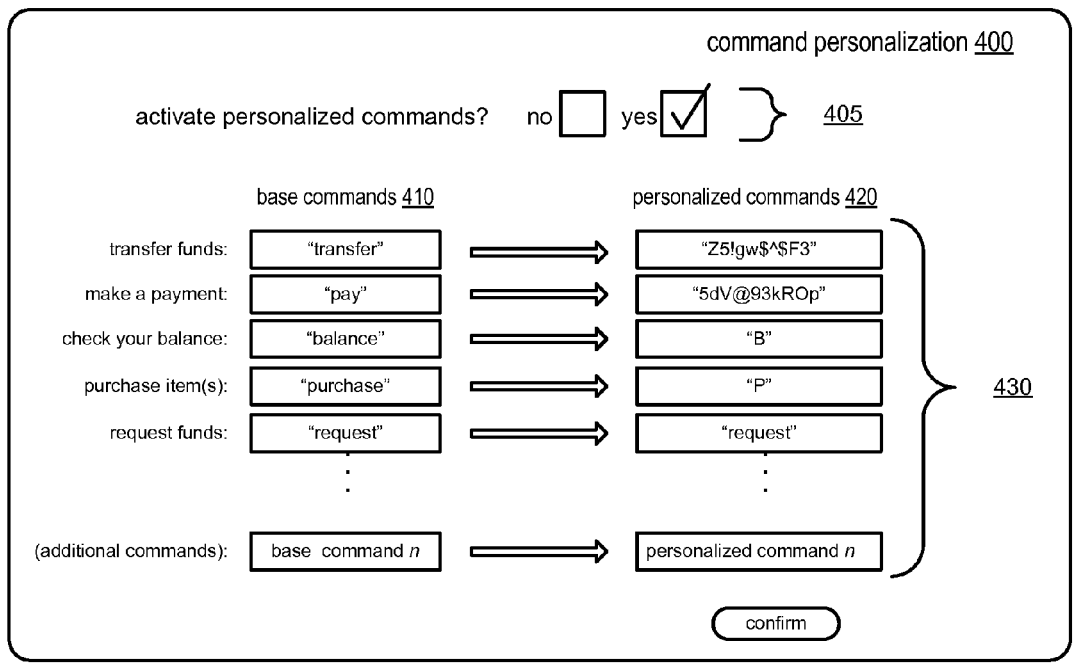
FIG. 4 illustrates an example of a display for registering personalized commands, according to various embodiments.

FIG. 4 illustrates one example of a user interface display that may be generated and/or provided by the command management component described herein. In various embodiments, command personalization display 400 may include a control for activating personalized commands. For instance, if control 405 is selected, the command management component described herein may record (e.g., in a user configuration file) information that indicates the user has activated personalized commands. If the control is not selected, the command management component may record information that indicates the user has not activated personalized commands for their account (and thus base commands should be used for such account). As illustrated, command personalization display 400 may include a listing of one or more base commands, such as base commands. For instance, the base command for transferring funds may be "transfer." Likewise, the base commands for making a payment, checking a balance, purchasing an item, and requesting funds are illustrated as "pay," "balance," "purchase," and "request," respectively. Note that these base commands are presented for illustrative purposes and are not intended to be limiting. Other types of based commands are possible and contemplated. As illustrated by text entry fields 430, command personalization display 400 may include one or more text entry fields that enable a user to submit a personalized command, such as ones of personalized commands 420, for each corresponding base command. Generally, the specific personalized commands may be specified by the user as they see fit. However, in some embodiments, one or more requirements may be applied to the personalized commands. For instance, in some embodiments, a minimum or maximum string length or some other requirement may be applied to personal commands.

In some embodiments, personalized commands may be tailored to be highly secure, such as case-sensitive string of various characters, numbers, and symbols. One example of such a command includes "Z5!gw$^$F3," which is illustrated by the personalized command corresponding to the base command "transfer." In other cases, personalized commands may be tailored to rapid input, such as input on devices deficient of QWERTY input. For instance, such personalized commands could be tailored to be short, simple commands requiring few keystrokes or other input methods. One example of such a command includes "B," which is the personalized command corresponding to the base command "balance." In other cases, personalized commands may be the same as the corresponding base command (e.g., if the user is satisfied with the base command). For example, in the illustrated embodiment, the base command for requesting funds and the personalized command for requesting funds are both "request."

In various embodiments, the command management component described herein may be configured to ensure that redundancies do not exist among personalized commands submitted via such user interface. In one embodiment, the command management component may determine that a user is attempting to submit a personalized command that corresponds to a particular base command, whereby the particular personalized command has already been submitted for another base command of the base command set. In order to avoid conflict or redundancies, the command management component may prompt the user to change at least one of the personalized commands. However, in other embodiments, the command management component may enable a user to correlate the same personalized command with two base commands. For instance, a particular personalized command could be correlated with a base command for making a payment and a base command for checking an account balance. In this way, when the user submits the particular personalized command, two separate actions are performed (e.g., a payment is made and the account balance is checked). In some embodiments, and number of base commands may be correlated to a single base command.

As described above, some base commands may be need to be highly secure from fraudulent individuals. For instance, the user may desire to prevent an unauthorized fund transfer. Accordingly, in various embodiments, the command management component may be configured to enable a user to disable one or more base commands instead of providing personalized commands for the base commands. In other words, if a user designates that a particular base command should be disabled (e.g., by leaving ones of fields 430 empty), the command management component and/or the payment service described herein may be rendered unresponsive to such base commands.

Figure 5:
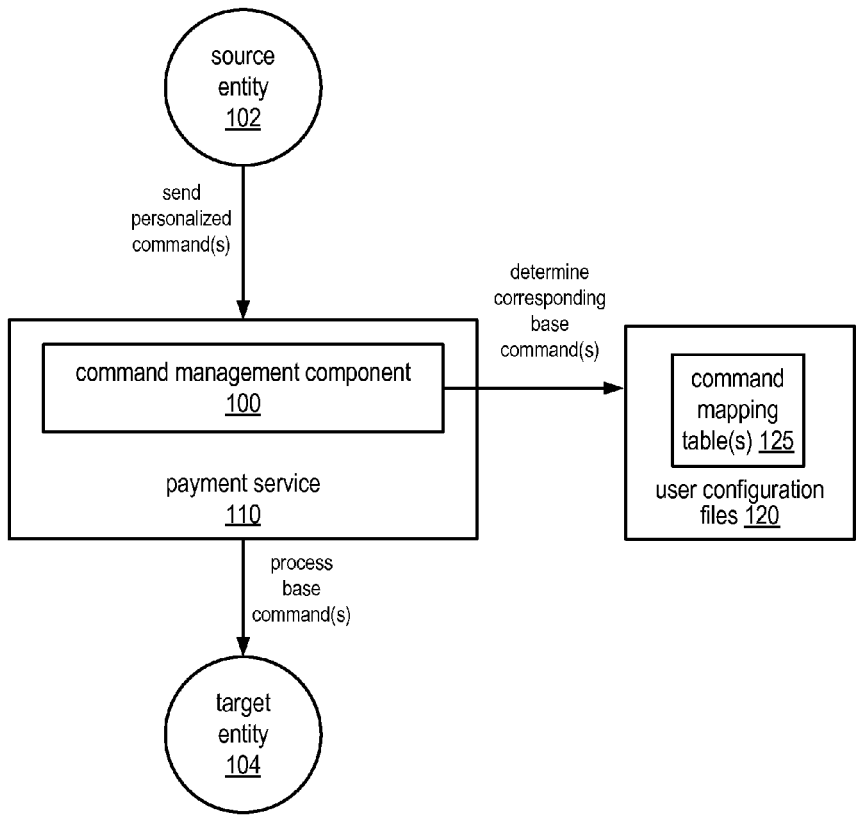
FIG. 5 illustrates a block diagram of the processing of personalized commands within a payment service, according to various embodiments.

FIG. 5 illustrates the command management component determining base commands from personalized commands, according to some embodiments. As described above, command mapping table(s) 125 may store mapping information that indicates the personalized commands for a particular user, such as personalized commands registered in a manner as described above with respect to FIGS. 3-4. For each personalized command, the mapping information may also indicate to which base command such personalized command corresponds. Accordingly, the command management component may be configured to use such mapping information to determine, for a particular personalized command, a corresponding base command.

As described above, messages sent to payment service 110 may include information for identifying the user (e.g., source entity), such as caller ID information or another identifier (e.g., user's name, account number, etc.). Accordingly, when a message is received by the payment service, the command management component may be configured to determine the entity that sent such message (e.g., by using the caller ID or other identifier to lookup the user's identity from customer records). In various embodiments, the command management component may be configured to locate the user's configuration file and determine whether personalized commands have been activated for the user's account, such as described above with respect to FIG. 4.

If personalized commands have not been activated for the user's account, the command management component may determine that messages sent from the user are to include base commands. In this case (e.g., personalized commands have not been activated), if a command parsed from such messages is of the base command set, the command management component (and/or the payment service) may process the command or provide the base command to the payment service for further processing. For example, the command management component (and/or the payment service) may process a command to transfer funds (e.g., the "transfer" command), by transferring funds from entity 102 to entity 104 (and/or transferring funds from an account controlled by entity 102 to an account controlled by entity 104). However, in the case that the received command is not of the base command set, the command management component may not process the command and may instead perform one or more security measures.

One such security measure may include tracking the number of times an incorrect command (e.g., a command outside of the base command set, in this example) has been received. In various embodiments, if the number of times an incorrect command has been received exceeds a particular lockout threshold, the command management component may "lockout" that user's account. In other words, if the number of times an incorrect command has been received exceeds the threshold, the command management component may not process subsequent commands received for that user's account. In some cases, the user's account may be reactivated subsequent to such lockout. For instance, the command management component (and/or the payment service) may be configured to contact the user (in some cases through a separate communications channel) to unlock the account. For instance, the user may be required to enter a Personal Identification Number (PIN), another security code, and/or other security related information (e.g., a mother's maiden name). In various embodiments, the lockout threshold may be specified by the user (e.g., source entity 102), the command management component, or the payment service.

While in some cases incorrect commands may be submitted by fraudulent individuals (e.g., an individual that has stolen a cell phone or other device from which commands may be sent), in some cases, the submission of an incorrect command may be a mistake submitted by a legitimate user. Accordingly, in some embodiments, after receiving an incorrect command, the command management component may be configured to provide a notification to the user, such notification indicating that an incorrect command has been submitted. For instance, one example of such a notification might include: "You have submitted an incorrect command. If you submit three or more incorrect commands, you may be temporarily locked out of your account."

If personalized commands have been activated for the user's account, the command management component may determine that messages sent from the user are to include personalized commands, such as personalized commands registered in the manner described above with respect to FIG. 3 and FIG. 4. In this case (e.g., personalized commands have been activated), if a command is of the personalized command set, the command management component may determine the base command that corresponds to the personalized command. In one embodiment, the command management component may determine the corresponding base command, e.g., by accessing mapping information from command mapping tables 125. For instance, as described above, the mapping information may indicate such personalized commands (e.g., personalized commands registered in the manner described above with respect to FIG. 3 and FIG. 4) and the base commands to which the personalized commands correspond. Accordingly, the command management component may determine, for a given personalized command, the corresponding base command based on such mapping information. Once the corresponding base command is determined, the command management component may process the command and/or provide the base command to the payment component for further processing.

For example, consider the base commands and personalized commands described above with respect to FIG. 4. For instance, consider the following command, which is not intended to be limiting:

5dV@93kROp <amount> to <phone number>

In this example, the command management component may determine that personalized commands have been activated for the particular user's account (e.g., by checking an account preference of an account associated with the user that sent such command). The command management component mapping table may the search mapping information of mapping table(s) 125 to determine which base command corresponds to the personalized command "5dV@93kROp" as indicated by the mapping information. In this example (as is the case in the illustrated embodiment of FIG. 4), the personalized command corresponds to the base command "transfer," which is a command for transferring funds. Accordingly, the command management component (and/or the payment service) may process the command to transfer funds, e.g., by transferring funds from entity 102 to entity 104 (and/or transferring funds from an account controlled by entity 102 to an account controlled by entity 104). However, in the case that the received command is not of the personalized command set, the command management component may not process the command and may instead perform one or more security measures.

One such security measure may include tracking the number of times an incorrect command (e.g., a command outside of the personalized command set, in this example) has been received. As described above, if the number of times an incorrect command has been received exceeds a particular lockout threshold, the command management component may "lockout" that user's account. In other words, if the number of times an incorrect command has been received exceeds the threshold, the command management component may not process subsequent commands received for that user's account. In some cases, the user's account may be reactivated subsequent to such lockout. For instance, the command management component (and/or the payment service) may be configured to contact the user (in some cases through a separate communications channel) to unlock the account. For instance, the user may be required to enter a Personal Identification Number (PIN), another security code, and/or other security related information (e.g., a mother's maiden name). In various embodiments, the lockout threshold may be specified by the user (e.g., source entity 102), the command management component, or the payment service.

As described above, in some cases incorrect commands may be submitted by fraudulent individuals (e.g., an individual that has stolen a cell phone or other device from which commands may be sent), in some cases, the submission of an incorrect command may be a mistake submitted by a legitimate user. Accordingly, in some embodiments, after receiving an incorrect command, the command management component may be configured to provide a notification to the user, such notification indicating that an incorrect command has been submitted. For instance, one example of such a notification might include: "You have submitted an incorrect command. If you submit three or more incorrect commands, you may be temporarily locked out of your account."

Figure 6:
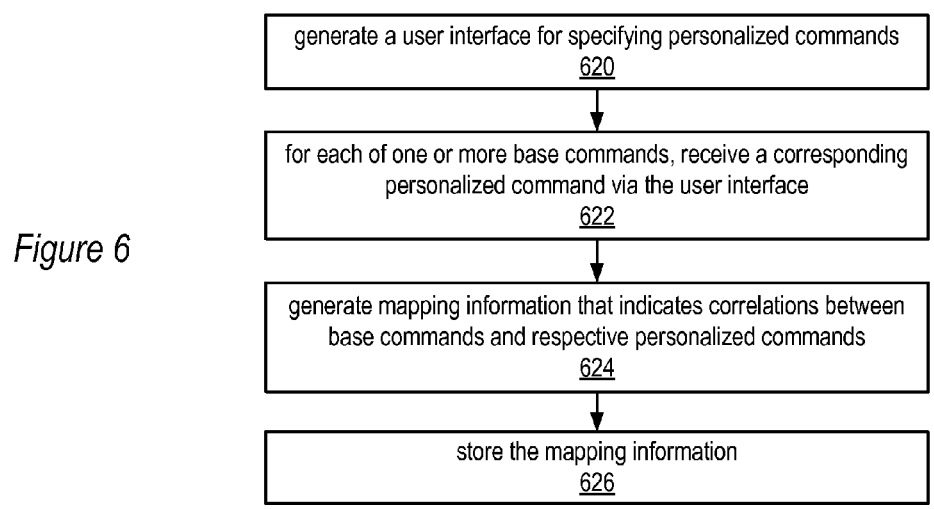
FIG. 6 illustrates a flowchart of an exemplary method for generating mapping information, according to various embodiments.

Various methods may be employed by the command management component described herein. The methods described herein may in various embodiments be implemented by a command management component, such as command management component 100. An example of one such method is illustrated by the flowchart of FIG. 6. The method may include generating (and/or providing) a user interface for specifying personalized commands (block 620). For instance, the method may include generating a user interface that includes a listing of base commands, such as commands to which a payment service (e.g., payment service 110) is responsive. Such user interface may also include one or more user input fields or controls for inputting personalized commands, such as commands chosen by a user interacting with the user interface. In various embodiments, the method may include generating a display that enables a user (e.g., source entity 102) to specify a personalized command for each base command listed. In various embodiments, generating a user interface for specifying personalized commands may include generating a display, such as the display described above with respect to FIG. 4. Note that the display of FIG. 4 is merely one example of such a user interface; other types of displays are possible and contemplated.

In various embodiments, the method may include, for each of one or more base commands, receiving a corresponding personalized command via the user interface (block 622). For example, such user interface may include one or more input fields or controls for inputting a personalized command. Accordingly, the method may include receiving such personalized commands. For instance, in the exemplary display of FIG. 4, the method may include receiving personalized commands 430. In various embodiments, the method may include generating mapping information that indicates correlations (or correspondences) between base commands and respective personalized commands (block 624). For instance, as described above, commands mapping tables 125 may include mapping information that indicates various personalized commands and an indication of, for each personalized command, a base command to which the personalized command corresponds. The method may also include storing the mapping information (block 626). For instance, the method may include storing mapping information as one or more mapping tables, such as mapping tables 125. In some embodiments, the mapping information may be stored with or as part of a user configuration file, such as user configuration files 120 described above.

The flowchart of FIG. 7 illustrates one example of a method for receiving and processing commands, according to various embodiments. The method may include receiving a message including a command (block 720). For example, as described above, various messages may include commands for a payment service. For instance, an entity (e.g., source entity 102) may desire to transfer funds to another entity (e.g., target entity 104). Accordingly, one type of message may include a transfer command for transferring funds between entities. For example, two types of commands for transferring funds between entities are illustrated in the exemplary display of FIG. 4. As illustrated in FIG. 4, the base command for transferring funds is "transfer" and the personalized command for transferring funds is "Z5!gw$ˆ$F3." In various embodiments, the method may also include receiving other types of commands, such as commands of services other than payment services.

The method may further include determining a user account based on the message (block 722). For instance, in various embodiments, the received message may include information that may be used to identify the entity that sent the message. For example, the message may include an account number, a phone number, a name, or some other identifier. In one embodiment, the message may include information for identifying a user configuration file (e.g., one of user configuration files 120) and/or mapping information (e.g., one of command mapping tables 125). Accordingly, in various embodiments, the method may include determining a user account based on the information within the received message. For example, the message may be sent via a cell phone or other telecommunications device and the method may include accessing a user's telephone number from the message (or, alternatively, by utilizing caller ID) and using such telephone number to determine an account associated with the telephone number.

In various embodiments, the method may include determining whether personalized commands are specified for use with the account (block 724). For instance, in one embodiment, the method may include accessing a user configuration file associated with the account (e.g., one of user configuration files 120). As described above, user configuration files may include account preferences. In some embodiments, such account preferences may include an indication of whether personalized commands should be activated for the account (e.g., an indication corresponding to item 405 of FIG. 4). Accordingly, the method may include accessing such an indication to determine personalized commands are specified for use with the account.

If personalized commands are specified for use with the account, the method may include determining whether the received command is a personalized command (block 726). For instance, the method may include accessing mapping information, such as the mapping information described above with respect to mapping tables 125, and searching the personalized commands specified by the mapping information (for the particular account). If the received command matches a personalized command specified by the mapping information, the method may include determining that the received command is a personalized command. If the received command is does not match any of the personalized commands specified by the mapping information, the method may include determining that the received command is not a personalized command.

If the command is a personalized command, the method may include determining a base command from the personalized command (block 728). For example, mapping information (e.g., mapping information of mapping tables 125) may include a list of personalized commands for use with an account as well as respective base commands to which such personalized commands correspond. For instance, the method may include determining a based command that corresponds to the received command as specified by the mapping information, such as mapping information of mapping tables 125 described above.

After the base command has been determined, the method may include processing the base command or, alternatively, providing the base command (or an indication thereof) to another entity configured to process such commands (block 730). For instance, in one embodiment, the method may be implemented by the command management component described herein and the processing of the base command may be performed by the command management component (and or the payment service). However, in some embodiments, the method may include providing the base command (or an indication thereof) to another entity, such as through a web services interface.

If the command is not a personalized command, the method may include not processing the command (block 732). For instance, such command could be a command incorrectly entered by a user. In other cases the command could be a fraudulent command, such as a command sent by a fraudulent individual. Accordingly, in some embodiments, if the command is not a personalized command, the method may include performing one or more security measures (block 734). For instance, as described above, a counter could be used to keep track of the number of incorrect commands submitted. The method may include keeping track of such counter and locking a user's account if such number reaches a particular threshold.

If personalized commands are not specified for use with the account, the method may include determining whether the received command is a base command (block 736). If the received command is a base command, the method may include processing the base command or, alternatively, providing the base command (or an indication thereof) to another entity configured to process such commands (block 738). For instance, in one embodiment, the method may be implemented by the command management component described herein and the processing of the base command may be performed by the command management component (and or the payment service). However, in some embodiments, the method may include providing the base command (or an indication thereof) to another entity, such as through a web services interface.

If the received command is not a base command, the method may include not processing the command (block 740). For instance, such command could be a command incorrectly entered by a user. In other cases the command could be a fraudulent command, such as a command sent by a fraudulent individual. Accordingly, in some embodiments, if the command is not a personalized command, the method may include performing one or more security measures (block 742). For instance, as described above, a counter could be used to keep track of the number of incorrect commands submitted. The method may include keeping track of such counter and locking a user's account if such number reaches a particular threshold.

The block diagrams of FIGS. 8A-8D illustrate exemplary configurations of systems including a command management component, according to some embodiments. In each of FIGS. 8A-8D, network 810 may be a variety of networks include but not limited to Local Area Networks (LANs), Wide Area Networks (WANs), telecommunication networks (e.g., mobile voice and data networks), some other type of network, or some combination thereof. In general, network 810 may be configured to support communication via any of the various communication channels described herein.

Figure 8A:
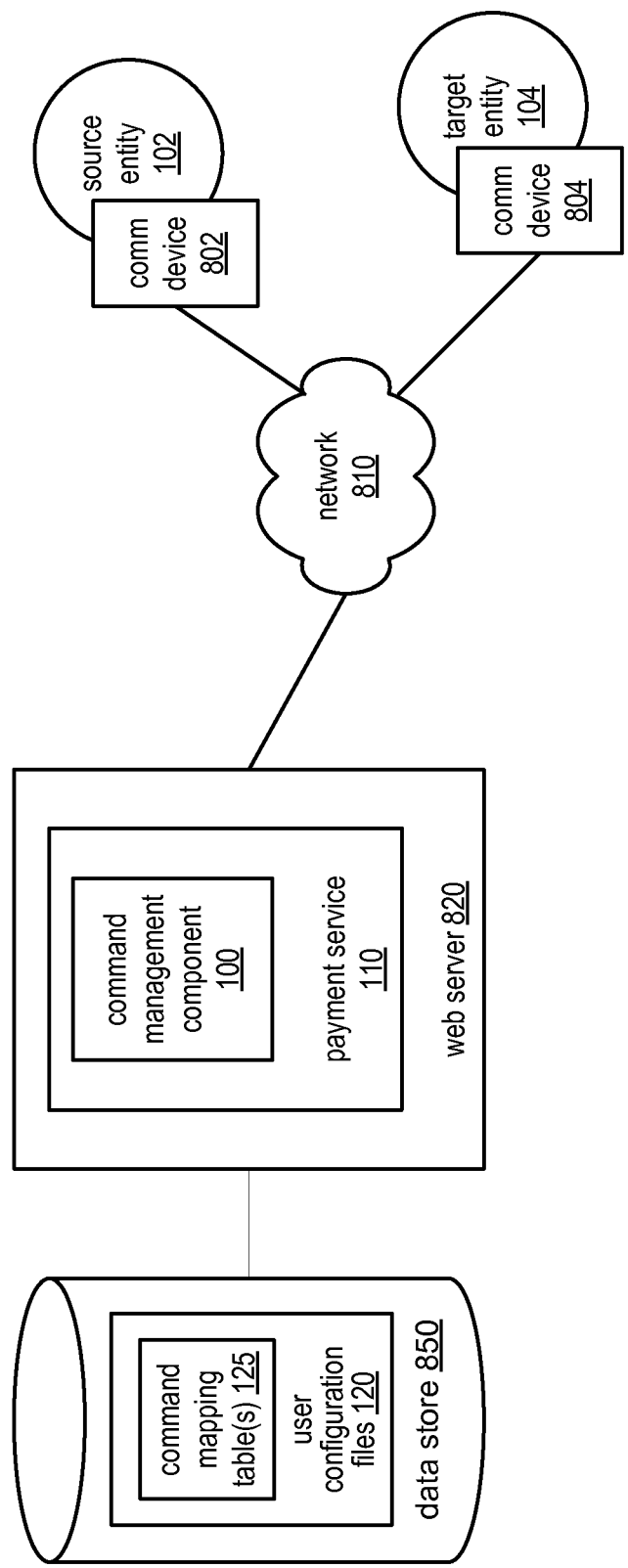
FIGS. 8A-8D illustrate various system configurations for a system including a command management component, according to various embodiments.

As illustrated by FIG. 8A, the command management component may in various embodiments be configured as a component of a transaction manage service (e.g., payment service 110), according to some embodiments. For instance, in various embodiments payment service 110 may be an application executing on a web server, such as web server 820. In this example, command management component 100 may be an application extension or another item configured to extend the functionality of payment service 110. For instance, command management component 100 may enable payment service to process personalized commands, such as the personalized commands described herein. Additionally, source entity 102 and target entity 104 may communicate with command management component 100 (and/or payment service 110) via communication devices, such as communication device 802 and communication device 804. Communication devices 802 and 804 may include various devices including but not limited to cellular or mobile telephones (or other devices configured to communicate via voice or text message communications), devices configured to communication via email, conventional land-based telephones, and/or devices configured to communicate via any of the various communication channels described herein. Additionally, data store 850 may be a back-end database or other system configured to store user configuration files 120 and/or command mapping tables 125.

Figure 8B:
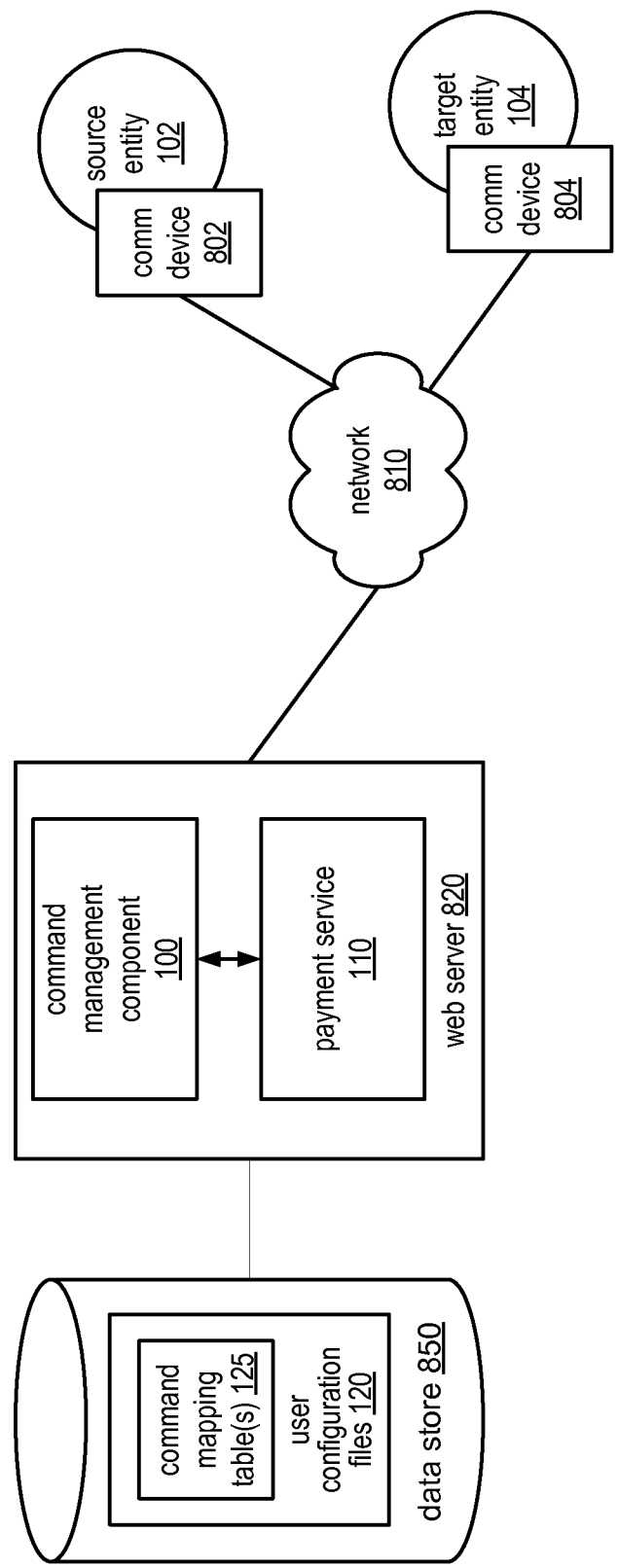

In other embodiments, such as the illustrated embodiment of FIG. 8B, command management component 100 may be implemented as an application separate from the payment service yet residing on the same web server 820. For instance, command management component may be an application configured to service requests from payment service 110. For instance, in one embodiment, if payment service 110 receives a personalized command from source entity 102, the payment service 110 may request that command management component 100 determine the corresponding base command (e.g., as indicated by mapping information 125) and return the base command (or an indication thereof) to the payment service for further processing. Note the other elements of FIG. 8B may operate in a manner similar to (or the same as) the respective, like-numbered elements of FIG. 8A.

Figure 8C:
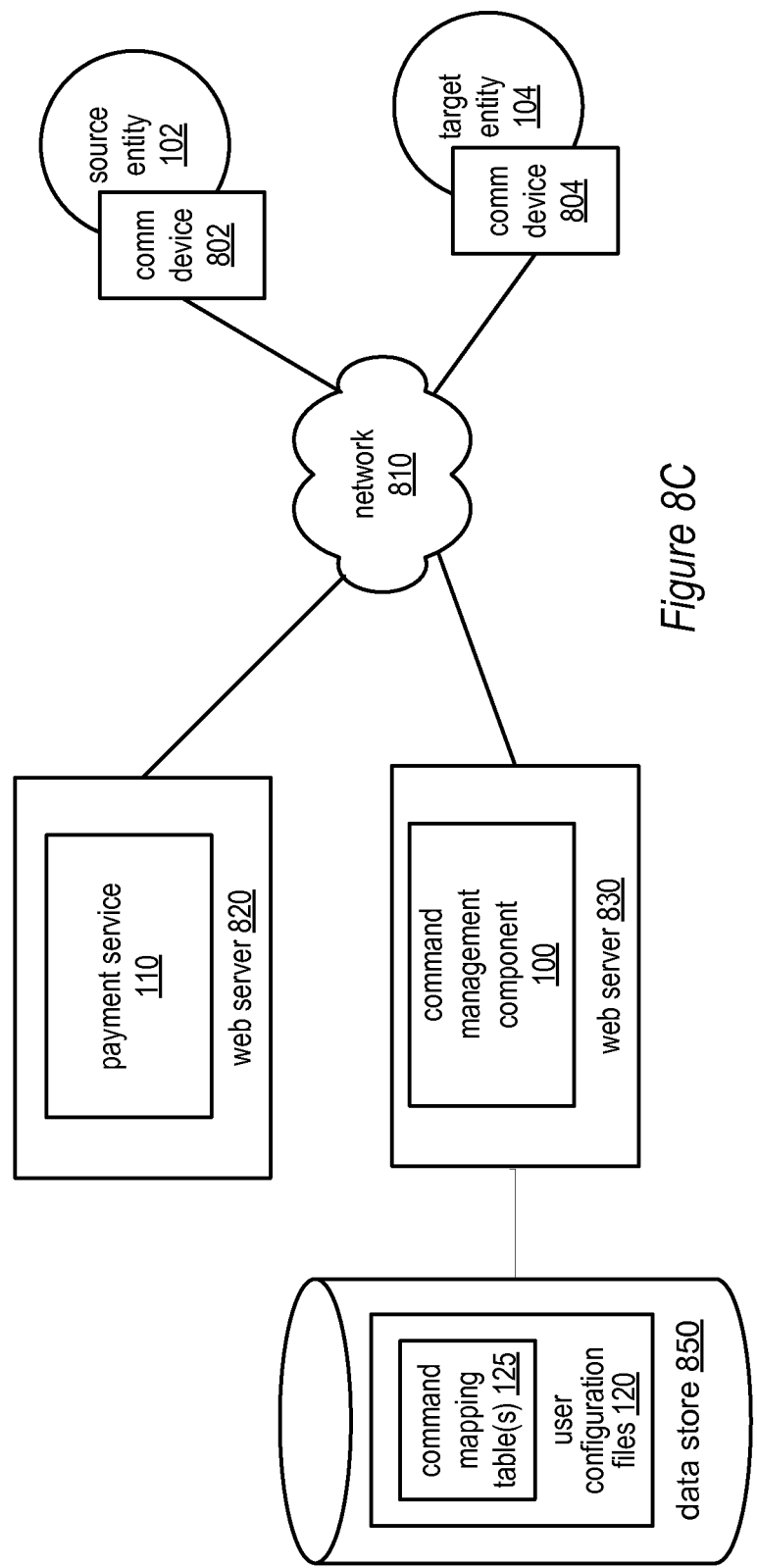
Figure 8D:
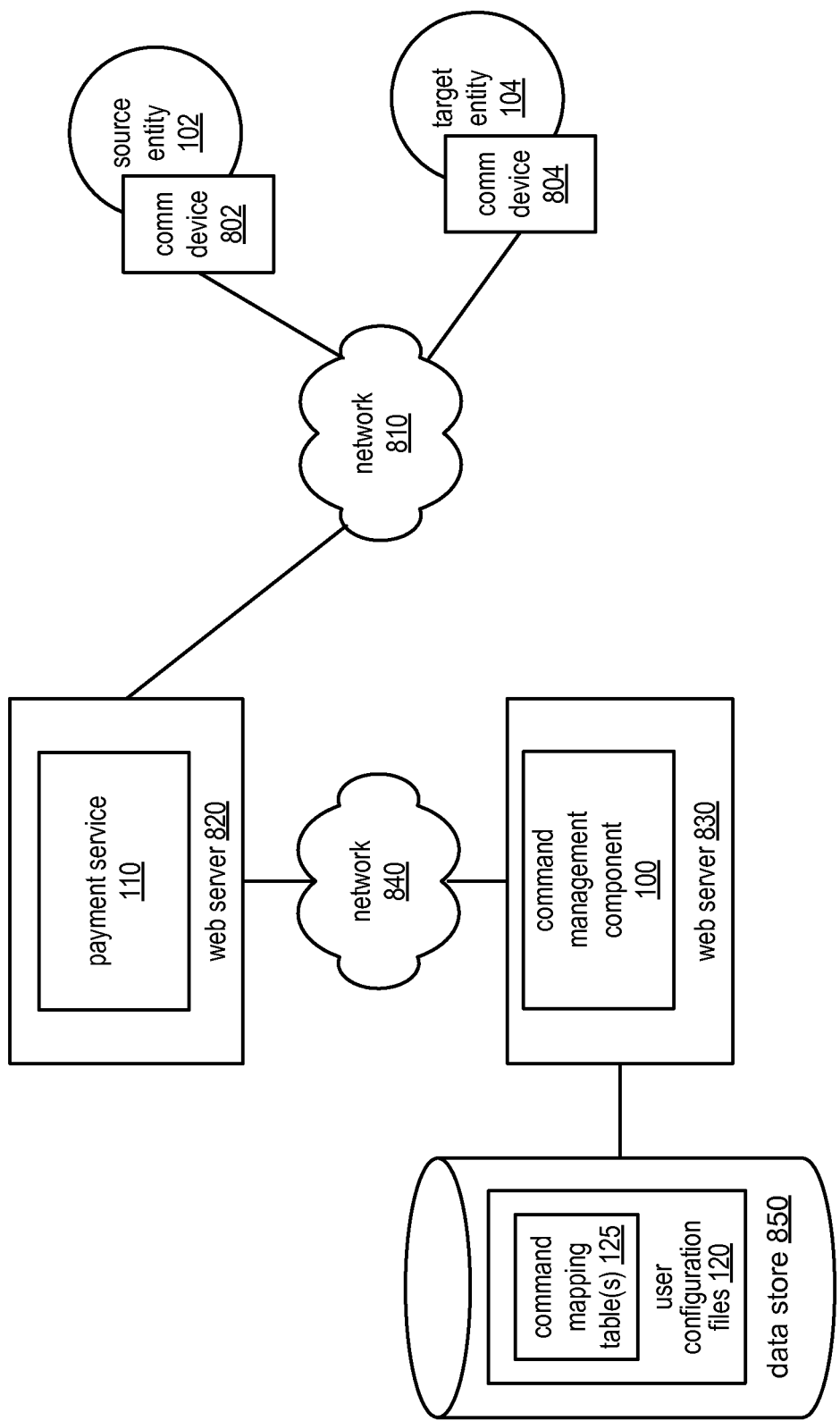

In other embodiments, command management component 100 may be configured to be executed on a computer system (e.g., web server 830) separate from the computer system on which the payment service 110 executes, such as illustrated by the block diagram of FIG. 8C. For instance, in the illustrated embodiment, command management component 100 may be a web service configured to service requests from payment service 110. For instance, command management component 100 may be configured to service requests to determine base commands from personalized commands. As illustrated by FIG. 8D, payment service 110 may communicate with command management component 100 via network 840, which may in various embodiment be a network separate from network 810. For instance, in one embodiment, network 810 may be a wireless communications network configured to transport text messages sent to and/or from communication device 802 and 804. In contrast, network 840 may be a WAN, such as the Internet, in this example.

Additional Embodiments

Figure 9:
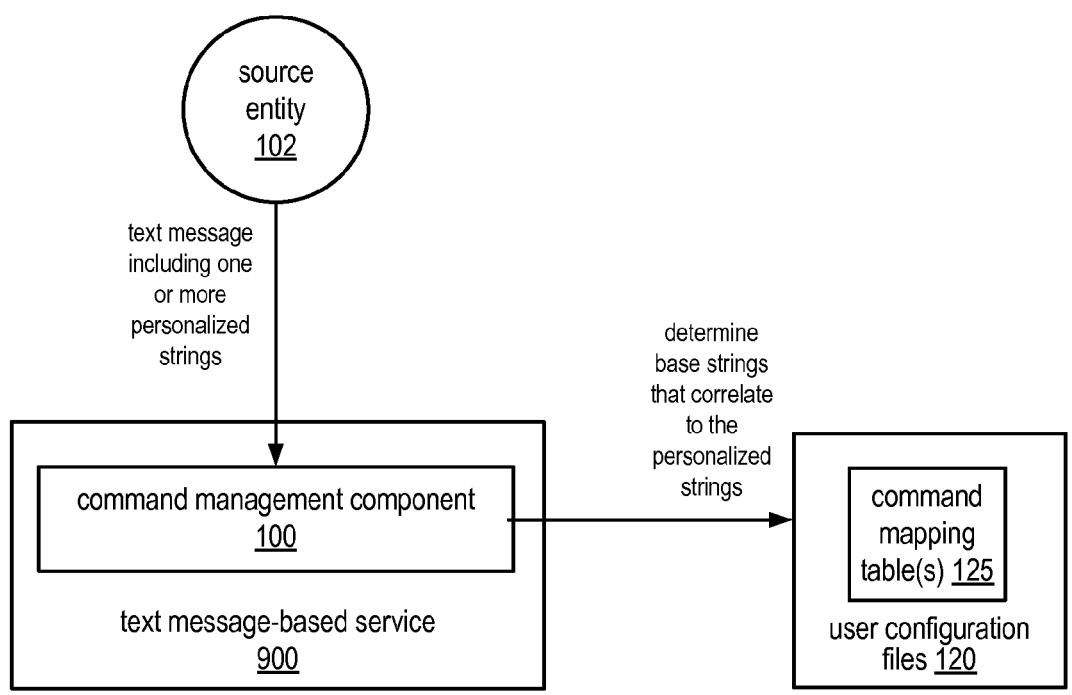
FIG. 9 illustrates the command management component implemented as a component of a text message-based service, according to various embodiments.

While the various embodiments described herein are largely described with respect to a payment service, the command management component may be implemented within a variety of different systems. In some embodiments, such as the illustrated embodiment of FIG. 9, command management component may be configured to interact with a text-message based service, such as text message-based service 900. In general, a text message-based service may include any service configured to receive/send text messages from/to one or more users, such as source entity 102. In various embodiments, such users may have an account established with the text message-based service. In some embodiments, the text message-based service may support the SMS messaging protocol; however, in other embodiments other messaging protocols may be employed whether such protocols are currently known or developed in the future.

In various embodiments, the command management component may be configured to operate on items that are not necessarily commands. For instance, in the illustrated embodiment, the command management component may be configured to enable a source entity to communicate with text message-based service 900 with one or more personalized strings. Such personalized strings may correspond to respective base strings. In some case, such base strings may be strings to which the text message-based service is responsive. For instance, such strings to which the text message-base service is responsive may be commands. However, in other cases, the base strings may instead be payload of a text message. In other words, the base strings may be strings that are to be delivered by the text-message based service to other entities (e.g., strings of a text message sent between two mobile phone users).

Similar to the embodiment described above with respect to FIG. 4, the command management component 100 may be configured to generate and/or provide a user interface that enables the user (e.g., source entity 102) to specify the personalized strings. In various embodiments, a personalized string may be provided for each of multiple base strings. In some embodiments, such base strings may be specified by the command management component. However, in some embodiments, such user interface may enable the user to specify both a base string and a corresponding personalized string.

In various embodiments, for a base set of strings including one or more base strings, the command management component may enable a user (e.g., source entity 102) to register one or more corresponding personalized strings. In various embodiments, each personalized string may be different than its respective base string. In one example, a personalized string may be an abbreviated version of a corresponding base string. Such personalized strings may facilitate quicker and easier text entry. For instance, on various devices, such as devices lacking a QWERTY keyboard, the personalized string "S" may be more convenient to type than the base string "search." In some embodiments, such personalized strings may be employed when security is not a primary concern of the user. In another example, a personalized string may include a sequence of letter, numbers, and/or symbols arranged in a manner to ensure high security. For instance, instead of the base string "06/12/1960" (e.g., a birth date) a personalized command might be "dˆB#28M3pR." In this way, if a user's device were to be lost or stolen, it may be difficult for an unauthorized individual to send such strings from the lost or stolen device. In various embodiments, this may also provide the added benefit of ensuring an eavesdropper (e.g., an individual viewing the input of such strings into the user's communication device) does not obtain knowledge of the actual base string. In various embodiments, command management component 100 may store mapping information that indicates the personalized strings, base strings, and/or correlations between respective personalized strings and respective base strings. For instance, such mapping information may be generated from information received via the above described user interface.

Accordingly, the command management application may in various embodiments be configured to determine base strings from personalized strings in text messages received from source entity 102. For instance, when text message based service 900 receives a text message, command management component 100 may determine the user's identity from, e.g., a phone number indicated by caller ID. The command management component may use such identifier to retrieve mapping information from command mapping tables 125. For each personalized string, the command management component may determine the corresponding base string from the mapping information. In some embodiments, the command management component and/or the text message based service may perform one or more actions in response to the base string. In one embodiment, the command management component may replace the personalized strings with their respective base strings within the received text message. This modified text message may then be forwarded to other entities in various embodiments.

Illustrative System

Various embodiments of a system and method for personalized commands, as described herein, may be executed on one or more computer systems, which may interact with various other devices. One such computer system is computer system 1000 illustrated by FIG. 10. Computer system 1000 may be capable of implementing a command management component, such as command management component 100. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a command management component, such as command management component 100 described above, are shown stored within system memory 1020 as program instructions 1022. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems (e.g., the illustrated communication devices and web servers), or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
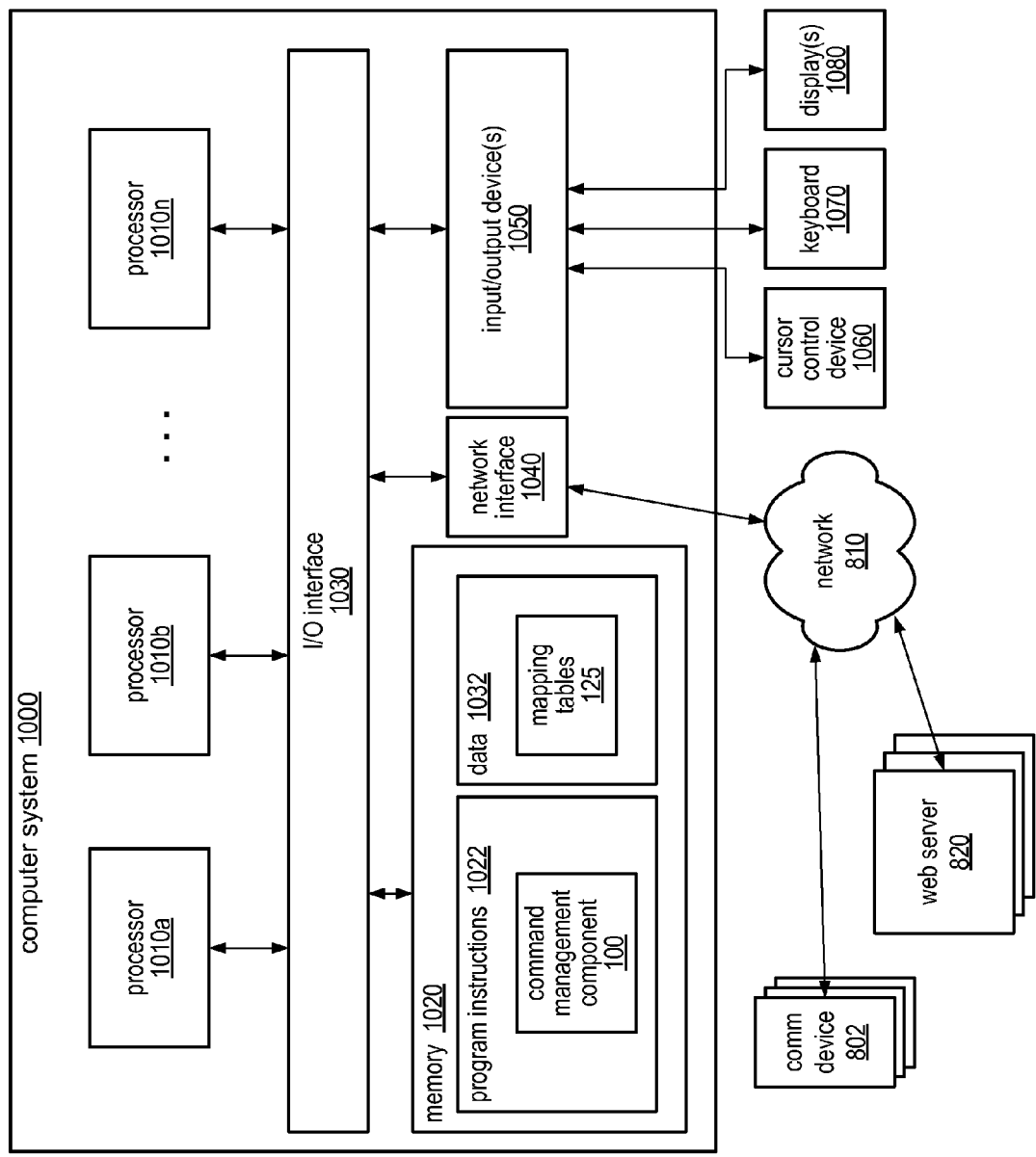
FIG. 10 illustrates an exemplary computer system suitable for implementing the various systems, components, and services described herein, according to various embodiments.

As shown in FIG. 10, memory 1020 may include program instructions 1022 configured to implement a command management component, such as command management component 100. In one embodiment, command management component 100 may implement the methods described above, such as the methods illustrated by FIGS. 6 and 7. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the steps of the methods may be changed, and various elements may be added, reordered, combined, omitted, modified, etc. Various modifications and changes may be made as would be obvious to a person skilled in the art having the benefit of this disclosure.

The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   a service implemented by one or more hardware computing devices and responsive to one or more base commands, wherein the service comprises:
      a command management component comprising program instructions that when executed cause the one or more hardware computing devices to:
         provide to respective remote devices for different ones of a plurality of accounts, a user interface for specification of one or more personalized commands for a respective account;
         receive from a respective one of the remote devices, via the user interface, an indication of one or more personalized commands for the respective account, the one or more personalized commands corresponding to one or more respective base commands for the respective account;

generate a mapping of the one or more personalized commands to the corresponding one or more respective base commands; and a data store configured to receive the mapping from the command management component and store the mapping, wherein the mapping comprises one or more respective associations between the one or more personalized commands and the corresponding one or more respective base commands;

wherein the command management component further comprises program instructions that are executed by the one or more hardware computing devices to:

receive from a different respective one of the remote devices, for a different account, different personalized information for one or more of the base commands;

generate another mapping of a different personalized command to a corresponding one of the base commands; and store the other mapping in the data store such that a request that is associated with the respective account or the different account and that specifies a personalized command is associated with a respective base command in accordance with the respective mapping for either the respective account or the different account.

2. The system of claim 1, wherein the data store is further configured to store one or more command mapping tables, and wherein the command management component further comprises program instructions that are executed by the one or more hardware computing devices to store the generated mapping information in the one or more command mapping tables of the data store.

3. The system of claim 1, wherein the user interface comprises a control for activating personalized commands for the particular account, selection of the control determining whether personalized command functionality is available for the particular account.

4. The system of claim 1, wherein the command management component further comprises program instructions that when executed cause the one or more hardware computing devices to:

determine that a submitted personalized command that corresponds to a particular base command has already been submitted for another base command of a base command set; and prompt the user to change at least one of the submitted personalized commands.

5. The system of claim 1, wherein the service is a payment service and the base commands comprise at least one of a balance command, transfer command, payment command or purchase command.

6. A computer-implemented method, comprising, for a plurality of accounts of a web service that is responsive to one or more base commands, the one or more base commands associated with respective functions of the web service and the respective functions provided for use by account users via indication of the one or more base commands:

providing, by a command management component of the web service implemented by one or more hardware computing devices to respective remote devices for different ones of a plurality of accounts, a user interface for specifying one or more personalized commands for the respective account, wherein the command management component is implemented by program instructions executed by one or more hardware computing devices;

receiving, by the command management component from a respective one of the remote devices via the user interface, one or more indications of one or more personalized commands for the respective account, the one or more personalized commands corresponding to one or more respective base commands for the respective account;

associating, by the command management component, the one or more indicated personalized commands with the respective one or more base commands;

storing, by the command management component to a data store, one or more respective associations between the one or more indicated personalized commands and the corresponding one or more respective base commands;

receiving, by the command management component from a different respective one of the remote devices for a different account of the plurality of accounts, one or more different personalized commands associated with respective one or more base commands;

associating by the command management component, the one or more different personalized commands with the corresponding one or more base commands; and storing, by the command management component, the association to the data store such that a request that is associated with the respective account or the different account and that specifies a personalized command is associated with a respective base command in accordance with the respective association for either the respective account or the different account.

7. The computer-implemented method of claim 6, wherein said storing, by the command management component to a data store further comprises storing the generated mapping information in command mapping tables in a data store.

8. The computer-implemented method of claim 6, further comprising providing, via the user interface, a selectable control for determining whether personalized command functionality is available for a particular account, selection of the selectable control activating personalized commands for the particular account.

9. The computer-implemented method of claim 6, further comprising:

determine that a submitted personalized command that corresponds to a particular base command has already been submitted for another base command of a base command set; and prompting the user to change at least one of the submitted personalized commands.

10. The computer-implemented method of claim 6, wherein the service is a payment service and the base commands comprise at least one of a balance command, transfer command, payment command or purchase command.

11. The computer-implemented method of claim 6, further comprising correlating, by the command management component, a particular personalized command with two or more base commands such that submission of the particular personalized command causes performance of two or more respective actions associated with the two or more base commands.

12. A non-transitory computer-readable storage medium storing program instructions that when executed on a hardware computer device implement a service responsive to one or more base commands, wherein a command management component of the service is configured to:

for different ones of a plurality of different accounts:
- provide, by the command management component to respective remote devices for different ones of a plurality of account, a user interface for specifying one or more personalized commands for a respective account;
- receive, from a respective one of the remote devices via the user interface, one or more indications of one or more personalized commands corresponding to one or more respective base commands for the respective account; and
- store, to a data store, the one or more respective associations between the one or more received personalized commands and the corresponding one or more respective base commands; and
- associate, for different accounts, different personalized information with respective base commands, such that a request that is associated with a particular account and that specifies at least one of the one or more personalized commands is associated with one or more respective base commands in accordance with the respective one or more respective associations for the particular account.

13. The non-transitory computer-readable storage medium of claim 12, wherein the command management component is further configured to store the generated mapping information to one or more command mapping tables of the data store.

14. The non-transitory computer-readable storage medium of claim 12, wherein the user interface is configured with a control for activating personalized commands for the particular account, and wherein selection of the control determines whether personalized command functionality is available for the particular account.

15. The non-transitory computer-readable storage medium of claim 12, wherein the command management component is further configured to enable disablement of one or more base commands such that the service is rendered unresponsive to the disabled one or more base commands.

16. The non-transitory computer-readable storage medium of claim 12, wherein the user interface is configured with one or more text entry fields that enable submission of the personalized commands.

17. The non-transitory computer-readable storage medium of claim 12, wherein the command management component is further configured to apply one or more requirements to the personalized commands, the requirements comprising a minimum or maximum string length.

* * * * *